US 11,463,511 B2

(12) United States Patent
Abhigyan et al.

(10) Patent No.: US 11,463,511 B2
(45) Date of Patent: Oct. 4, 2022

(54) MODEL-BASED LOAD BALANCING FOR NETWORK DATA PLANE

(71) Applicants: AT&T INTELLECTUAL PROPERTY I, L.P., Atlanta, GA (US); The George Washington University, Washington, DC (US)

(72) Inventors: Abhigyan, Newark, NJ (US); Wei Zhang, Bellevue, WA (US); Timothy Wood, Columbia, MD (US)

(73) Assignees: AT&T Intellectual Property I, L.P., Atlanta, GA (US); The George Washington University, Washington, DC (US)

( * ) Notice: Subject to any disclaimer, the term of this patent is extended or adjusted under 35 U.S.C. 154(b) by 72 days.

(21) Appl. No.: 16/222,711

(22) Filed: Dec. 17, 2018

(65) Prior Publication Data

US 2020/0195711 A1 Jun. 18, 2020

(51) Int. Cl.
*H04L 67/1008* (2022.01)
*H04L 67/101* (2022.01)

(52) U.S. Cl.
CPC ........ *H04L 67/1008* (2013.01); *H04L 67/101* (2013.01); *H04L 2212/00* (2013.01)

(58) Field of Classification Search
CPC ............... H04L 67/1008; H04L 67/101; H04L 2212/00; H04L 47/823; H04L 47/6255; H04L 67/1004
See application file for complete search history.

(56) References Cited

U.S. PATENT DOCUMENTS

| 6,393,458 | B1 | 5/2002 | Gigliotti et al. |
| 6,950,848 | B1 | 9/2005 | Yousefi'zadeh |
| 7,146,353 | B2 | 12/2006 | Garg et al. |
| 7,430,610 | B2 | 9/2008 | Pace et al. |
| 8,000,716 | B2 | 8/2011 | Tsao et al. |
| 8,250,198 | B2 | 8/2012 | Zhang et al. |

(Continued)

FOREIGN PATENT DOCUMENTS

| EP | 1365545 A1 | 11/2003 |
| GB | 2540647 A | 1/2017 |

(Continued)

OTHER PUBLICATIONS

Xu et al.; "A Load Balancing Model Based on Cloud Partitioning for the Public Cloud"; Tsinghua Science and Technology; vol. 18 No. 1; Feb. 2013; p. 34-39.

(Continued)

*Primary Examiner* — Nam T Tran
(74) *Attorney, Agent, or Firm* — Guntin & Gust, PLC; Matthew Tropper

(57) ABSTRACT

Software-based data planes for network function virtualization may use a modular approach in which network functions are implemented as modules that can be composed into service chains. Infrastructures that allow these modules to share central processing unit resources are particularly appealing since they support multi-tenancy or diverse service chains applied to different traffic classes. Systems, methods, and apparatuses introduce schemes for load balancing considering central processing unit utilization of a next hop device when processing a packet that uses a service chain.

20 Claims, 10 Drawing Sheets

(56) References Cited

U.S. PATENT DOCUMENTS

| | | | |
|---|---|---|---|
| 8,296,123 | B2 | 10/2012 | Thayer et al. |
| 8,484,656 | B2 | 7/2013 | Raja et al. |
| 8,738,357 | B2 | 5/2014 | Och et al. |
| 8,799,918 | B2 | 8/2014 | Sen |
| 9,135,075 | B2 | 9/2015 | Cherkasova et al. |
| 9,413,667 | B2 * | 8/2016 | Beliveau ............... H04L 67/148 |
| 9,503,378 | B2 | 11/2016 | Pan |
| 9,775,068 | B2 | 9/2017 | Fehske et al. |
| 10,158,568 | B2 * | 12/2018 | Gage ...................... H04L 45/74 |
| 10,637,750 | B1 * | 4/2020 | Bollineni ............. H04L 67/101 |
| 10,637,773 | B2 * | 4/2020 | Zhang ................ H04L 67/2804 |
| 2005/0278439 | A1 | 12/2005 | Cherkasova |
| 2010/0162260 | A1 | 6/2010 | Ibrahim |
| 2012/0198173 | A1 * | 8/2012 | Xu ...................... G06F 12/0813 |
| | | | 711/133 |
| 2016/0134531 | A1 * | 5/2016 | Assarpour ............... H04L 45/74 |
| | | | 370/392 |
| 2016/0165478 | A1 | 6/2016 | Yao et al. |
| 2017/0005935 | A1 | 1/2017 | Tao et al. |
| 2017/0250925 | A1 * | 8/2017 | Suzuki ............... H04L 47/6255 |
| 2017/0302553 | A1 | 10/2017 | Zafer et al. |
| 2017/0371692 | A1 | 12/2017 | Connolly et al. |
| 2018/0063018 | A1 * | 3/2018 | Bosch ................... H04L 45/306 |
| 2018/0069749 | A1 | 3/2018 | Singhal et al. |
| 2018/0146030 | A1 | 5/2018 | Weng et al. |
| 2018/0213441 | A1 | 7/2018 | Mehta et al. |
| 2018/0335824 | A1 * | 11/2018 | MacNamara ....... H04L 41/0893 |
| 2018/0351874 | A1 * | 12/2018 | Abhigyan ............... H04L 67/42 |
| 2019/0028347 | A1 * | 1/2019 | Johnston ............. H04L 41/0846 |
| 2019/0045000 | A1 * | 2/2019 | Hiremath ............... H04L 49/501 |
| 2019/0140863 | A1 * | 5/2019 | Nainar .................... H04L 45/34 |
| 2019/0199637 | A1 * | 6/2019 | Paramasivam ......... H04L 47/24 |
| 2020/0128440 | A1 * | 4/2020 | Srinivasamurthy ......................... H04W 36/0016 |

FOREIGN PATENT DOCUMENTS

| | | |
|---|---|---|
| GB | 2556746 A | 6/2018 |
| WO | WO 2017/107127 A1 | 6/2017 |

OTHER PUBLICATIONS

Kansal et al.; "Cloud Load Balancing Techniques: A Step Towards Green Computing"; IJCSI Int'l Journal of Computer Science Issues; vol. 9 No. 1; Jan. 2012; p. 238-246.

Singh et al.; "Autonomous Agent Based Load Balancing Algorithm in Cloud Computing"; Procedia Computer Science; vol. 45; 2015; p. 832-841.

Calheiros et al.; "Virtual Machine Provisioning Based on Analytical Performance and QoS in Cloud Computing Environments"; 2011 Int'l Conf.on Parallel Processing; p. 295-304.

Babu et al.; "Honey bee behavior inspired load balancing of tasks in cloud computing environments"; Applied Soft Computing; vol. 13; 2013; p. 2292-2303.

* cited by examiner

MODEL-BASED LOAD BALANCING FOR NETWORK DATA PLANE

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on the general purpose hardware. Each VNF may require one or more virtual machines (VMs) to be instantiated. In turn, VMs may require various resources, such as memory, virtual central processing units (vCPUs), and network interfaces or network interface cards (NICs). Cloud systems are complex multi-layer hardware and software systems that consist of multiple components, interacting with each other through complicated mechanisms. The operation and management of a large-scale cloud is highly susceptible to anomalies, attacks, and faults. Identifying the root causes is often difficult to diagnose even with the skilled operators.

This disclosure is directed to addressing issues in the existing technology.

SUMMARY

Network function virtualization (NFV) allows network functions to run as software on commodity servers. As they become more complex and grow in processing cost, replication is needed to ensure reliability and improve NF performance. However, balancing the load across multiple NFV servers can be challenging due to diverse service costs, server and flow heterogeneity, and dynamic workload conditions. Disclosed herein is a resource-aware load balancer for network function service chains (also referred herein to as NFVBalance or model-based load balancing). NFVBalance may model the CPU load on NFV servers in order to guide its load balancing policies, while achieving high performance. This may be executed by a networking library implemented in software.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Software-based data planes for NFV may use a modular approach in which network functions (NFs) are implemented as modules that can be composed into service chains. Infrastructures that allow these modules to share CPU resources are particularly appealing since they support multi-tenancy or diverse service chains applied to different traffic classes.

Disclosed herein are systems, methods, and apparatuses that introduce a cluster-wide deployment of such a modular data plane. Conventional efforts on modular data planes focus on techniques to perform the workload assigned to an execution thread. The subject matter disclosed herein considers the complementary problem of how to assign workloads to NFV servers and cores.

Multiple issues that are addressed herein. A first issue may be associated with the designed model. The designed mode should be a simple model that can predict the utilization of a CPU core as a function of the traffic assigned to it and a parameter that represents the per packet processing cost. Further, this model should work well even with multiple traffic classes, each with different processing costs. In addition, the model should be robust to cross-core interference and different types of processing performed by NF modules.

A second issue may be associated with the usefulness of the model in load balancing traffic across CPU cores or across servers, among other things. In particular, how effective is the model in meeting diverse load balancing objectives, e.g., consolidate load on the least number of cores, minimize the maximum load on any core among a given number of cores, or ensure that higher priority traffic classes do not experience CPU load above a given threshold.

A model-based approach may offer advantages over a monitoring-based approach. Models for NFV resource utilization may enable automation systems to predict behavior and proactively manage the system. In contrast, a more passive monitor-driven approach is likely to have out of date information potentially resulting in load oscillations. Since a model-based approach does not rely on continuous monitoring from processing cores, the model-based approach may also avoid measurement overhead at those cores.

The disclosed methods and systems addresses issues with regard to integrating a model-based approach with a stateful load balancer deployed in front of a pool of NFV servers. In particular, disclosed herein is: 1) how the load balancer may efficiently track traffic statistics for each traffic class across multiple processing threads; 2) how to translate the model into a load balancing strategy that is amenable to an efficient implementation; and 3) providing performance gains of a model-based approach in view of other strategies such as round-robin.

Figure 1:
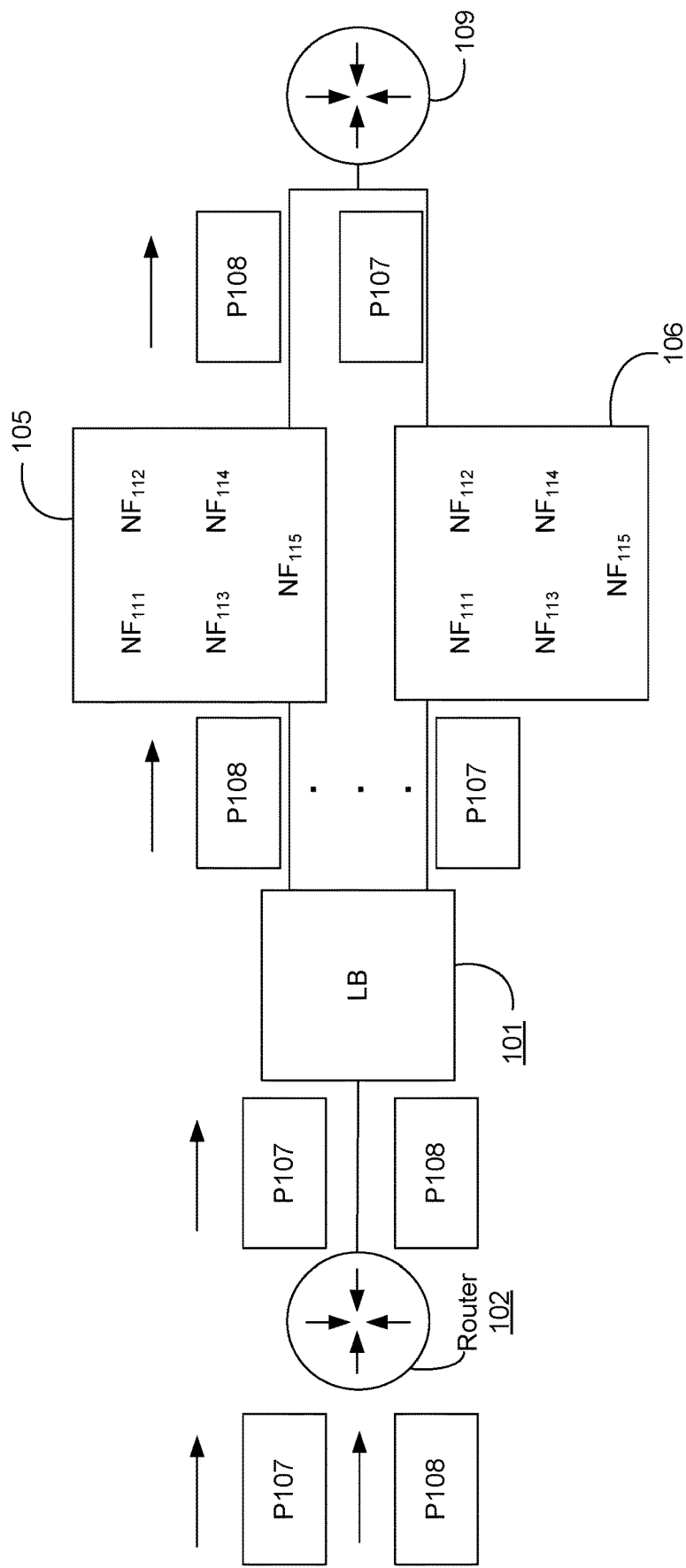
FIG. 1 illustrates an exemplary system that may incorporate model-based load balancing.
Figure 2:
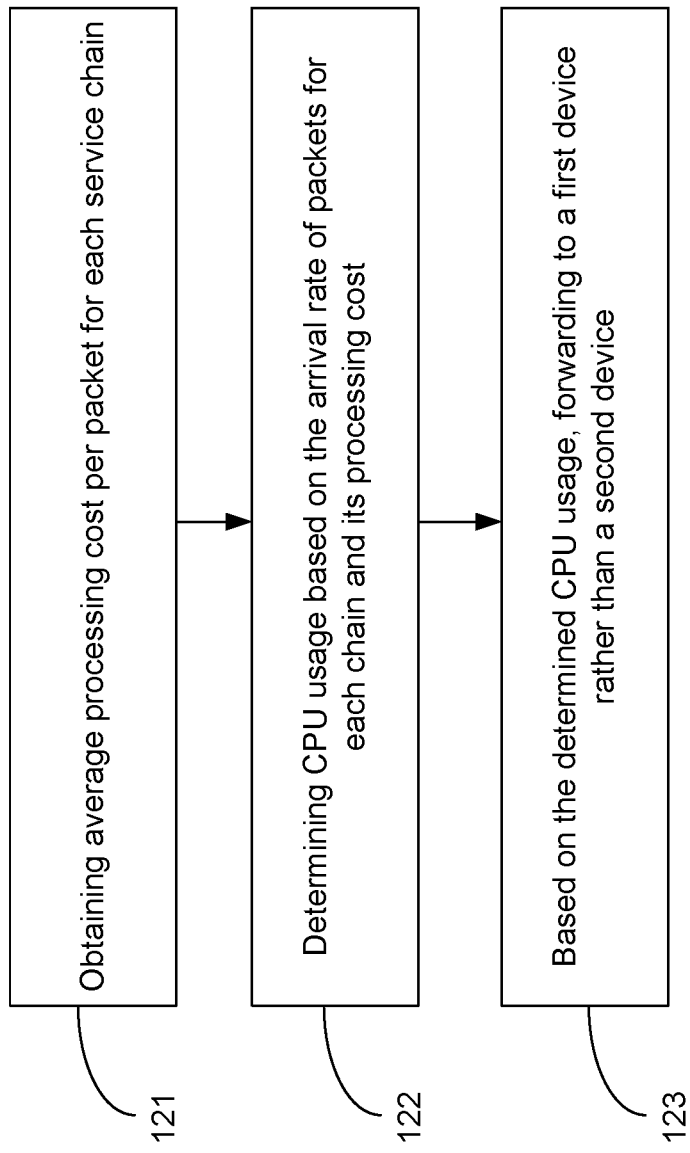
FIG. 2 illustrates an exemplary method for model-based load balancing.

FIG. 1 illustrates an exemplary system 100 that may incorporate model-based load balancing. System 100 may include router 102, load balancer (LB) 101, server 105, server 106, or router 109, which may be communicatively connected with each other. Server 105 and server 106 may comprise of multiple network functions (e.g., NF 111-NF 115) that may be used in a service function chain (also referred as service chain). A service function chain (SFC)

may consist of a sequence of network functions (NFs), such as L3 Stateless Firewall, L4 Statefull Firewall, L7 Firewall, Intrusion Detection System (IDS), Intrusion Prevention System (IPS), Web Filtering, Antivirus/Antispyware, WAN Optimizer (WANx), or Load Balancers (LB), among other things. The SFC may stitch these NFs together through pre-defined policy rules, such a set of NFs may construct a service chain with use cases in various networks. The advent of Software Defined Networking (SDN) has facilitated traffic steering in SFC, by leveraging logically centralized control plane and providing the programmability for a forwarding plane. As shown, there are exemplary packets (e.g., packet 107 and packet 108) that may move through the system FIG. 2 illustrates an exemplary method for model-based load balancing. At step 121, LB 101 may obtain the processed cost per packet for each service chain. This processing cost may be based on multiple calculations that were previously calculated about similar servers with similar specifications at some previous time. LB 101 may be pre-configured with costs, obtain the costs from another device (e.g., server 105), perform the calculations itself, or the like. These calculations may be updated at any frequency level. It is contemplated that it may be more efficient to update on a less frequent basis (e.g., weekly or monthly) in order to reduce the need to monitor the network in a way that substantially redirects computer processing resources. The processing cost may be the median, mean, or mode for each SFC after consideration of a plurality of particular SFCs.

With continued reference to FIG. 2, at step 122, central processing unit (CPU) usage may be obtained for communicatively connected network devices that may execute a SFC for a received packet (e.g., packet 107). This determination may be an estimate (e.g., forecast) based on the arrival rate of packets for each service function chain and its corresponding processing cost obtained in step 121. LB 101 keeps track of the number of packets (in view of each SFC) a server is receiving and the model helps determine how much it costs a network device (e.g., server 105 or server 106) to process the packet. Further details disclosed herein (e.g., FIG. 5).

At step 123, LB 101 forwards the packet (e.g., packet 107) to a first network device (e.g., server 106) rather than a second network device (e.g., server 105) based on the determined CPU usage of step 122. For example, once packet 107 is received, LB 101 may determine the current CPU usage for each server that may execute the corresponding SFC for packet 107 (e.g., the "eligible" servers). Based on a threshold amount of determined CPU usage, LB 101 may forward packet 107 to minimize CPU usage for the eligible servers. In addition, usage of the links between LB 101 and server 105 or server 106 may be considered. LB 101 may consider the determined (e.g., forecasted) CPU usage before packet 107 is processed or after packet 107 is processed before determining that a threshold is met and thereafter making a forwarding decision.

CPU load is a significant metric to evaluate whether an NFV system is overloaded or is wasting resources. A system may have a server monitor its CPU usage and report them to a controller or load balancer. It is contemplated herein however that traffic in a high performance NFV environment can change rapidly. This may result in stale monitoring data. Rather than rely on feedback from data plane nodes (e.g., server 105), the system for model-based load balancing include a model that may predict CPU usage (e.g., CPU load), which may affected by the NF or SFC processing cost per packet and the number of packets per second. To train the model, there may be an initial profiling of each network function to calculate the average processing cost (e.g., median, mode, or mean) per packet for each service chain. Then an estimate of the CPU usage may be determined as a product of the arrival rate of packets for each chain and its processing cost (e.g., CPU usage×arrival rate). Aggregating across the service chains on a specific core results in an estimate of the overall load.

Figure 3:
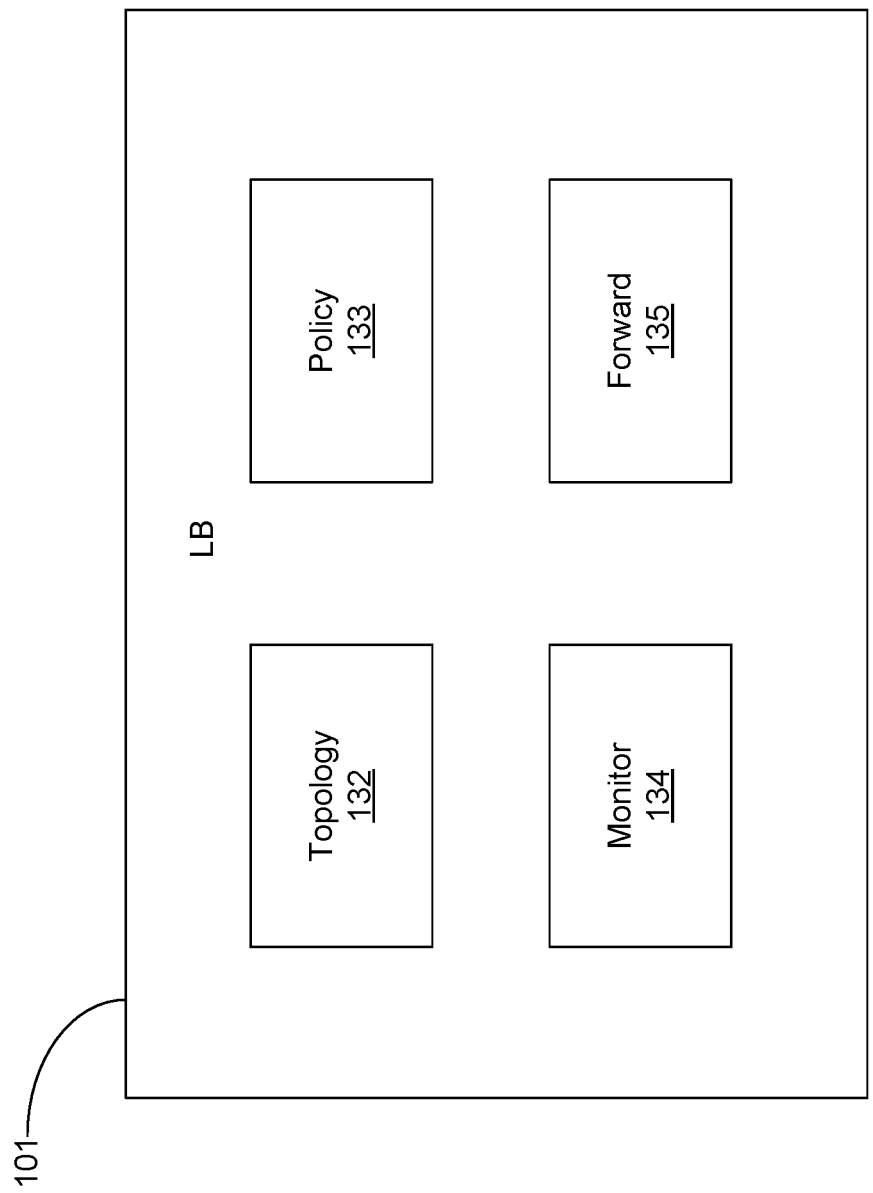
FIG. 3 illustrates exemplary components of NFVBalance in LB.

FIG. 3 illustrates exemplary components of NFVBalance in LB 101. The critical path for packet processing goes through the Forwarder 135 components, which can be replicated across multiple threads for scalability. Forwarder 135 redirects incoming packets to an NFV server (e.g., server 106) running the appropriate service chain. To avoid contention between threads, each Forwarder 135 maintains its own statistics about the flows it processes. This data is then periodically aggregated by the Monitoring component (monitor 134), which tracks statistics on a per-traffic class basis. Topology Controller 132 tracks which service chains are active on which servers (e.g., NF 111 may be active on server 105, but not on server 106) and can start and stop additional replicas. Information from topology controller 132, monitor 135, and forwarder 135 may be fed to policy component 133, which guides balancing decisions made by Forwarders 135.

With reference to policy component 133, the model-based load balancing architecture may separate the data path (e.g., through Forwarders 135) from the monitoring and control paths. The separation of data and control paths is helpful because control messages are much fewer but are important to ensure system works as expected. Due to this separation, control message may be reliably delivered over a separate channel dedicated for this purpose. Data message may use a separate network channel that has much more capacity, but also has much higher volume of traffic and is prone to congestion. This model-based load balancing architecture allows load-balancing policies to be periodically updated and pushed to Forwarders 135. Such dynamic load balancing may be necessary to deal with server heterogeneity and dynamism in NFV workloads, e.g., short-lived vs. long-lived flows, and skewed inter-arrival times of flows. However, the load balancing policy should not be complex, especially in networks with a high arrival rate of flows. Disclosed herein is a way to dynamically distribute flows in a light manner, which can take into account flow and server heterogeneity. Flows and connections may be used interchangeably. The load balancer may make its decision on a per-connection (e.g., flow) basis. If the load balancer decides that all packets in a connection may be served by a network function X, then network function X should receive all packets in that connection.

The load balancing policy may use the disclosed model to dynamically adjust weights for a weighted round-robin policy. Further examples are disclosed herein for this and other schemes. For each core, an aggregate processing cost AC can be calculated as a product of processing cost for each chain and the number of packets of each chain over the total number of packets on that core. The weight of a core is determined based on the objective of load balancing, e.g, to minimize the load on the most utilized core; we use 1/AC to get an updated weight for that core.

In an example, NFVBalance may be compared to round-robin. There may be two data plane nodes—server 105 and server 106. On each server there may be a use of one core to run two service chains. The processing cost of each service chain may be different on each server (chain 0, server 1: 100 ns; chain 0, server 2: 200 ns; chain 1, server 1: 100 ns; chain 1, server 2: 300 ns). Table 1 shows that round robin results in a CPU usage of server 2 that is twice that of server 1, while NFVBalance achieves a much more even load distribution.

Balancing the load across multiple NFV servers can be challenging due to diverse service costs, server and flow heterogeneity, and dynamic workload conditions. Disclosed herein is resource-aware load balancer for network function service chains. NFVBalance may model the CPU load on NFV servers in order to effectively guide its load balancing policies. This may be done while simultaneously achieving high performance with a high-performance networking library (e.g., Data Plane Development Kit) that may be implemented within the application and bypass the operating system. Table 1 provides an example CPU usage of NFVBalance versus Round Robin. Note the networking libraries may be much faster than traditional networking libraries implemented within the operating system itself

TABLE 1

CPU usage of NFVBalance vs Round Robin

| | Server 1 CPU (%) | Server 2 CPU (%) |
|---|---|---|
| NFVBalance | 30.40 | 34.42 |
| Round Robin | 26.04 | 53.29 |

Figure 4:
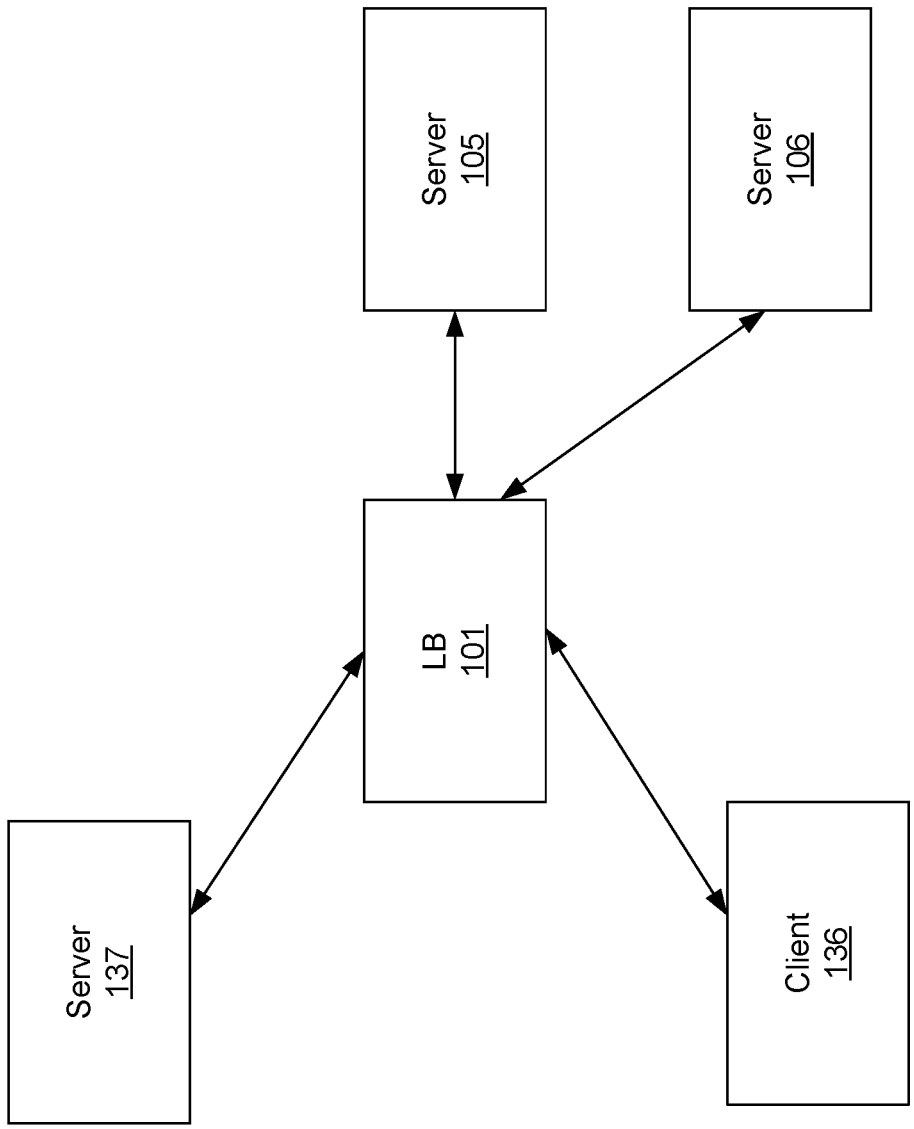
FIG. 4 illustrates an exemplary system that may incorporate model-based load balancing.

FIG. 4 illustrates an exemplary system that may incorporate model-based load balancing. FIG. 4 provides a different perspective of the system as shown in FIG. 1. As shown in FIG. 4, a client may connect with or through LB 101 to server 105. Server 105 and server 106 may have multiple NFs.

Figure 5:
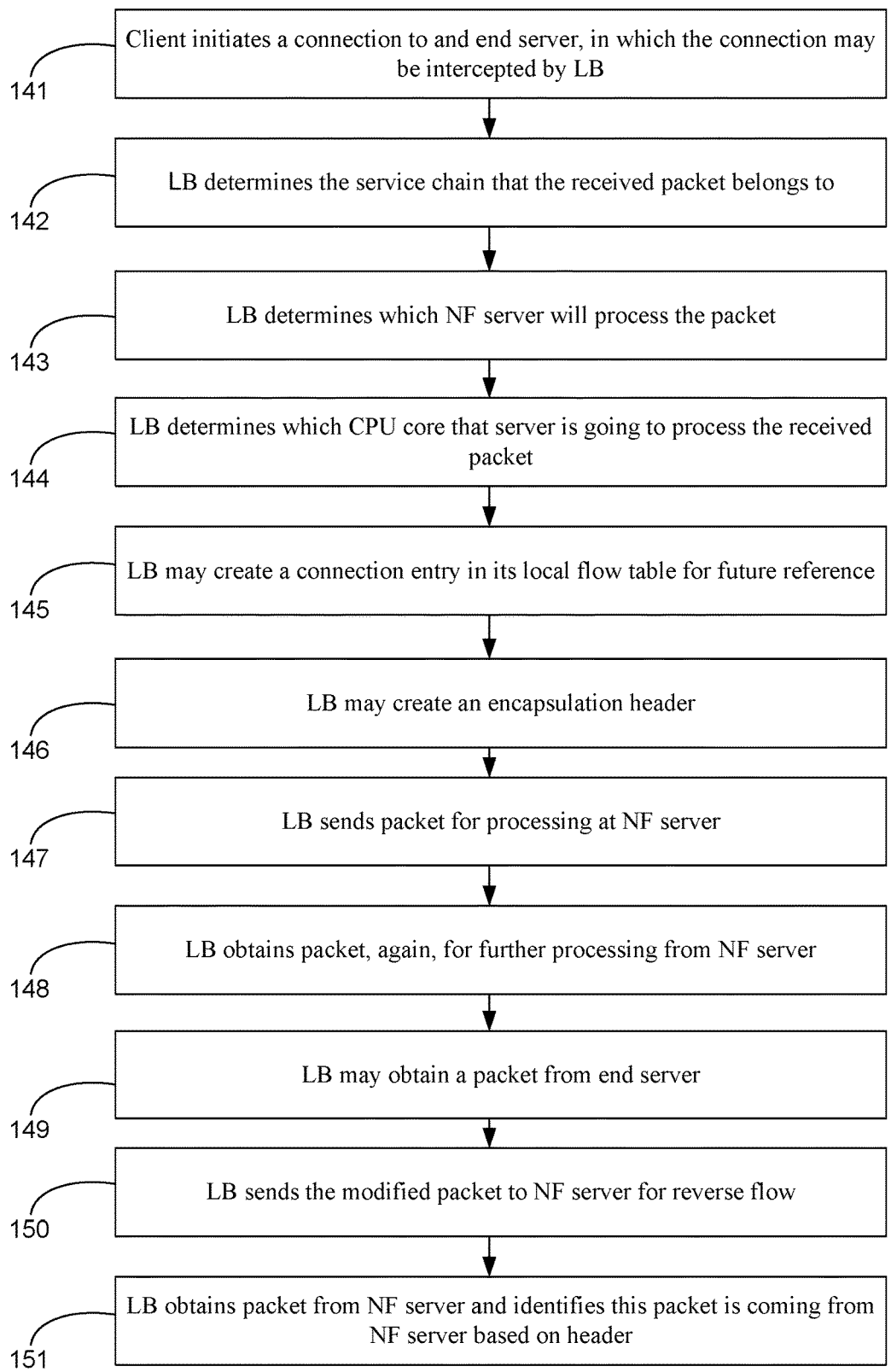
FIG. 5 illustrates an exemplary method for model-based load balancing.

FIG. 5 illustrates an exemplary method for model-based load balancing in view of FIG. 4. At step 141, client 136 initiates a connection to server 137, which may be intercepted by LB 101. Client device may be a user apparatus that starts a connection and server 137 may be the destination for the connection. LB 101 may be a service provider device that intercepts traffic between client 136 and server 137.

As provided in more detail herein, step 142-step 146 is associated with internal processing at LB 101. In short, LB 101 checks its internal flow table and creates entries if there is none. And sends the intercepted packet to the appropriate network function server (e.g., server 105) based on the internal flow table. More specifically, at step 142, LB 101 determines the service chain that the received packet belongs to (e.g., packet 108 received based on the intercepted connection at step 141). LB 101 may read the packet header, which may include fields such as source IP address, destination IP address, source port, destination port, or protocol number, among others. LB 101 matches these fields to a set of service chain definitions. Service chain definitions could be on a per customer basis, e.g., one for company X, and one for company Y. Once a service chain matching this packet 108 is identified, LB 101 uses the identifier for the service chain (e.g., SC1 that includes NF111 and NF112) for later processing.

With continued reference to FIG. 5, at step 143, LB 101 determines which NF server (e.g., server 105 or server 106) will process the packet. This termination may be based on 1) which NF servers are configured to process the packets for the identified service chain and 2) the load on those servers. LB 101 may use an algorithm to pick a NF server (e.g., server 105) and may use the server 105 in later processing. At step 144, LB 101 determines which central processing unit (CPU) core that server 105 is going to process the received packet of step 141. This may be a more fine-grained load balancing within server 105. LB 101 may also have the load information on individual CPU cores. Once server 105 is identified (previous step 143), at this step 144, LB 101 selects a CPU core among the available cores (not shown) on server 105.

Figure 6:
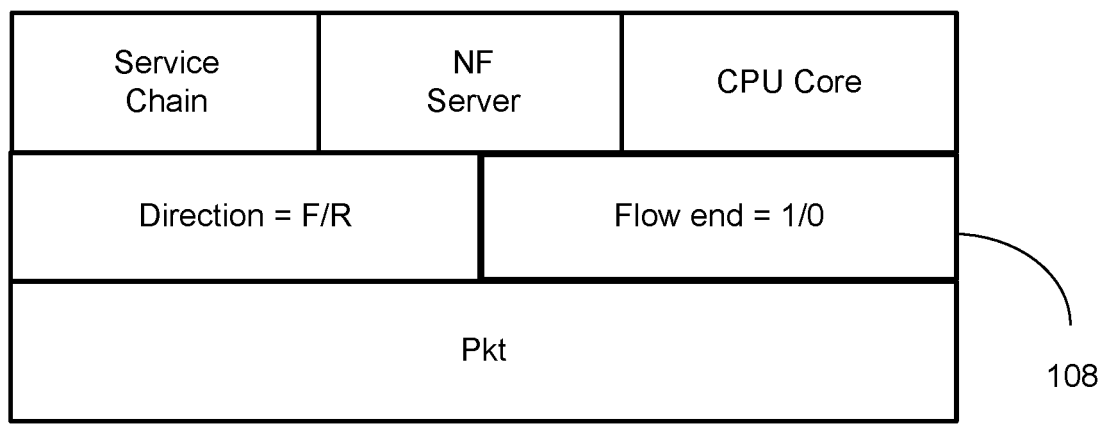
FIG. 6 illustrates an exemplary packet header.

At step 145, LB 101 may create a connection entry in its local flow table for future reference. LB 101 may only do the processing in steps 142, 143, and 144 for an initial packet of a connection or after a threshold period where an entry in the local flow table ages out (see also flow end parameter as disclosed in more detail herein). The connection entry may include a key and a value. The key may be based on packet header fields that are the same for all packets in a connection. (source IP, destination IP, source port, destination port, protocol number). The value may be an indicator for the determinations with regard to service chain, NV server, and core. At step 146, LB 101 may create an encapsulation header in order to correctly route packet 108 to chosen server 105. LB 101 balancer creates and adds a new header to help route packet 108 to the correct CPU core for NF processing. FIG. 6 illustrates an example of what may be in packet 108. The fields in of the header may include 1) service chain ID, 2) NF server ID, 3) CPU core ID, 4) direction (e.g., forward or reverse), or 5) flow end (e.g., 1 or 0). Direction and flow are discussed in more detail herein.

With continued reference to FIG. 5, at step 147, LB 101 sends packet 108 for processing at NF server 105. When server 105 receives the packet, it may examine the encapsulation header (e.g., FIG. 6) to determine which CPU core to use. When the CPU core examines the service chain ID field in the header, it processes the packet as per the service chain. Note the packet processing may modify the packet header fields. After NF server 105 processes packet 108, it may send packet 108 back to LB 101. At step 148, LB 101 obtains packet 108, again, for further processing. In a first case, LB 101 finds that a connection entry already exists for packet 108. LB 101 also recognizes that packet 108 is coming from NF server 105 based on the encapsulation header. LB 101 may remove the encapsulation header (FIG. 6) and send the packet towards destination server 137 (e.g., server 137 may be outside the data center housing the service provider's network functions). In a second case, at this step 148, LB 101 does not find that a connection entry already exists for this packet 108. LB 101 may recognize that packet 108 is coming from NF server 105 ad reads the service chain ID, NF ID, and core ID from the encapsulation header. LB 101 may then create a new entry with key (also referred herein as connection key) and value. The connection key may include a key based on modified packet header. The value may include service chain ID, NF ID, or core ID from encapsulation header. LB 101 then send packet 108 towards server 137.

With continued reference to FIG. 5, at step 149, LB 101 may obtain a packet from server 137. LB 101 may intercept packet 108, as configured to do so for certain connections to or from server 137. LB 101 finds that an entry already exists for this connection in its flow table. This entry may have been created at step 148. An entry should exist even if NF server 105 modified the packet header during processing in previous steps, because LB 101 should have created a new entry for the modified packet (e.g., step 148—second case). LB 101 may add the encapsulation header to packet 108$x$ (108"$x$" to denote association with the previous packet 108, but acknowledging content may be significantly different) based on the connection table entry. LB 101 may set direction to R in packet header for reverse direction of the connection. LB 101 then sends the packet to NF server (e.g., server 105).

At step 150, LB 101 sends the modified packet 108*x* to NF server 105 for reverse flow. NF server 105 receives the reverse flow packet and starts processing this packet 108*x* at the CPU core indicated in the encapsulation header of packet 108*x* (it is contemplated that it may go through the previous process of step 142-step 146 although not discussed here). Since the direction is set to reverse (R), NF server 105 may execute the NFs in the service chain in the reverse order. In case NF server 105 modified this connection's packet during processing in the forward direction, this processing in the reverse direction may reverse the modification. It may create packet 108*x* with the original unmodified header. In an example, a network function for network address translation (NAT) maps a private IP address of a client to a public IP address in the forward flow of a connection. In the reverse flow of the same connection, it maps the public IP to the same private IP address of the client. After processing, NF server 105 sends the processed packet back to LB 101 with the same encapsulation header.

At step 151, LB 101 obtains packet 108*x* from NF server 105 and identifies this packet 108*x* is coming from NF server based on header. LB 101 should also find an existing connection entry in its flow table for this packet. LB 101 should remove the encapsulation header and send the packet towards client 136. Described herein is the behavior of the first packet in a connection in the forward direction and the first packet in the reverse direction. Subsequent packets in a connection may be routed through the same components and should not need to create new entries in the flow table. They are forwarded based on the entries created in the flow table during forwarding of the first packet. Reusing the create entries helps ensure that the packets in a connection are processed by the same instance of the network function. This may be a significant property that should be desired to be incorporated into several network functions, failing which a network may incorrectly process a connection and can drop it completely.

It should be noted, referencing step 150 in which LB 101 sends the modified packet 108*x* to NF server 105 for reverse flow, if the network function modified the packet header, then it should be routed to the same network function (e.g., that NF server 105 would be able to undo the modification back to the original packet). If NF server 105 did not modify the packet header, then the reverse packet may be processed by another NF server, but it depends on the NF. Again, with continued reference to step 150, if the load balancer picked a different NF server for the reverse direction, it is contemplated that it may go through the previous process of step 142-step 146, although not discussed here.

Flow deletion—When a connection is deemed as terminated by the NF server 105, it may set the "flow-end=1" in the encapsulation header sent to the NF. This may happen in steps 147 or step 150. LB 101 may take flow-end=1 as an indication that the connection entry may be deleted. This feature may help keep flow table small by deleting old entries. The packet is processed twice by the load balancer in each direction (e.g., client→LB→NF→LB→server). The step of NF returning the packet back to the load balancer (step 147 and step 150) may be deemed as an extra cost on LB 101 because it needs to process twice as many packets. But this extra cost may be necessary based on one or more of the following reasons. Firstly, if the NF modifies the header in a packet being sent to the server, then the LB can learn the modified packet header when the NF returns the packet to the load balancer. This may be necessary later when the load balancer receives the packet from the server in the reverse direction. The load balancer should know which NF created this modified packet and may route the reverse direction packet to the correct NF. And, secondly, if the connection is terminated then the NF can communicate this to the load balancer (e.g., flow deletion). The extra cost incurred may help provide the features of flow deletion and being able to support network functions that modify the packet header.

Disclosed below are different schemes that allow LB 101 to evenly or otherwise appropriately distribute load across NF servers or among cores in an NF server. The different schemes may include weighted round robin (static), traffic-based, model-based, feedback-based, or model and feedback-based. With reference to weighted round robin (static), each NF server or CPU core may be assigned a static weight based on its processing power. Weight of an NF server may be the sum of weights of its cores. Upon the arrival of a new connection, an NF server or a CPU core on that server may be chosen in proportion to these weights. With reference to traffic-based, LB 101 may process all traffic in both directions. So LB 101 may measure a number of traffic statistics such as the number of connections (or packets or bytes) being sent to each NF server and CPU core. These statistics can be used to perform better load balancing. An example, strategy may be to set the weight of a CPU core to the inverse of the traffic it is receiving. Traffic-based may be better than the previous static policy because it is based on actual measurement of traffic that is updated at load balancer in real-time. With reference to model-based, this may be considered an enhancement to traffic-based. Model-based may consider the fact that different service chains may have different processing costs based on their constituent network functions. A model-based scheme may calculate a per-packet processing cost for a service chain as the sum of per-packet processing cost of its constituent network functions. For example, a service chain may have three NFs, A, B, C. The per-packet processing cost for A=100, B=200, C=300. The processing cost for entire chain is A+B+C=600. The model-based scheme may estimate the weight by multiplying the traffic on a CPU core by the per packet processing cost of the packet, which may yield a better estimate of the actual load on each CPU core than the previous traffic-based. Model-based may require an initial configuration of measuring per-packet cost for each NF in the system.

With reference to a feedback-based scheme, it may depend on the measurement of CPU load on each CPU core and each NF server. This may require additional monitoring at NF server for each core and require these measurements to be sent to LB 101. Once the load balancer receives these load values, LB 101 may use them to estimate the weight of each CPU core. For example, one way to set the weight may be to set them to the inverse of the load of the CPU core. Thus, a highly loaded core may have less weight and may receive less traffic in the future. With reference to hybrid model and feedback-based, as can been interpreted by the name it may use a model-based and feedback-based scheme together. An example way to design this hybrid strategy is to assess the CPU load as follows: if the model-based scheme predicts that the CPU load on a core is C_Model and the feedback-based scheme predicts that the CPU load on a core is C_Feedback, then the hybrid schemes predicts that the load on that core is (C_Model+C_Feedback)/2. This hybrid scheme may diminish inconsistencies with the separate model-based and feedback-based schemes. Note the logical entities disclosed in FIG. 3 may be used to implement the subject matter associated with FIG. 4-FIG. 6 (e.g., LB 101) and throughout.

Figure 7:
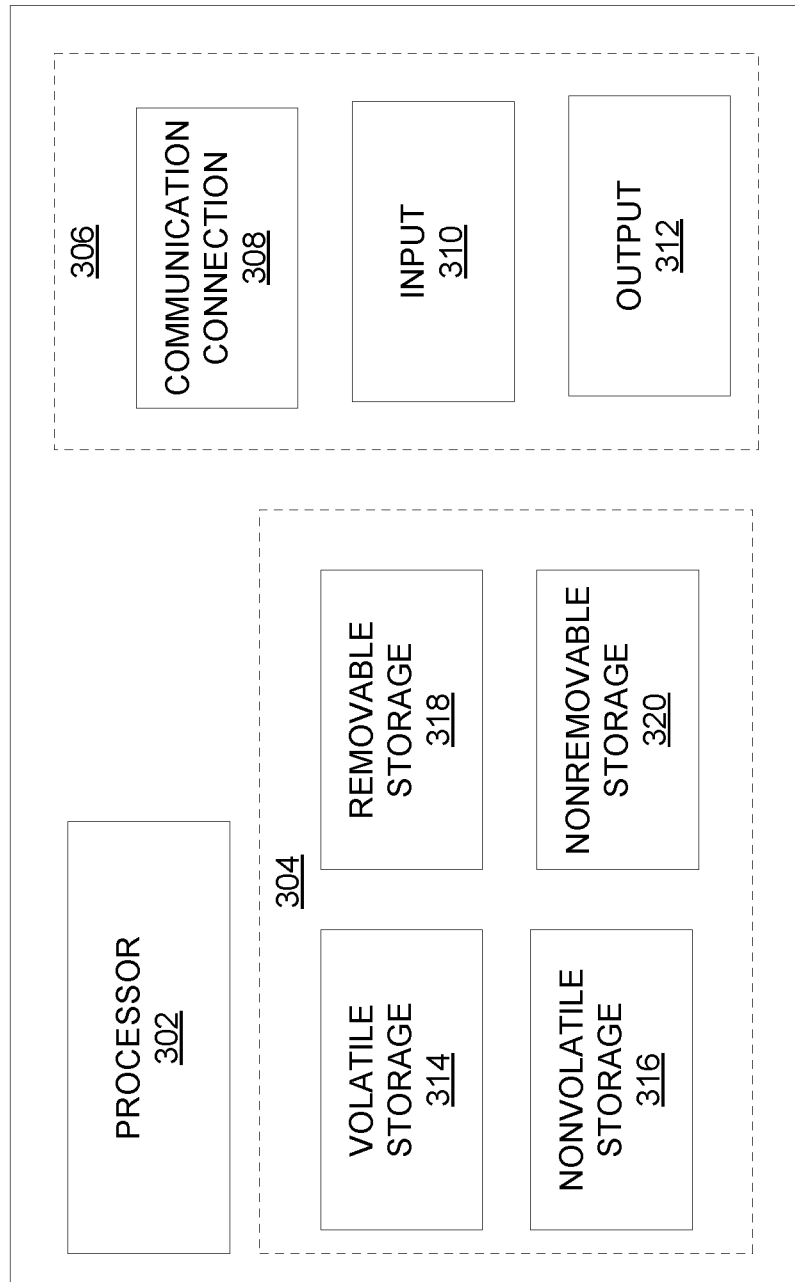
FIG. 7 illustrates a schematic of an exemplary network device.

FIG. 7 is a block diagram of network device 300 that may be connected to or comprise a component of server 105, router 102, or LB 101, among others. Network device 300 may comprise hardware or a combination of hardware and software. The functionality to facilitate telecommunications via a telecommunications network may reside in one or combination of network devices 300. Network device 300 depicted in FIG. 7 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 7) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 8:
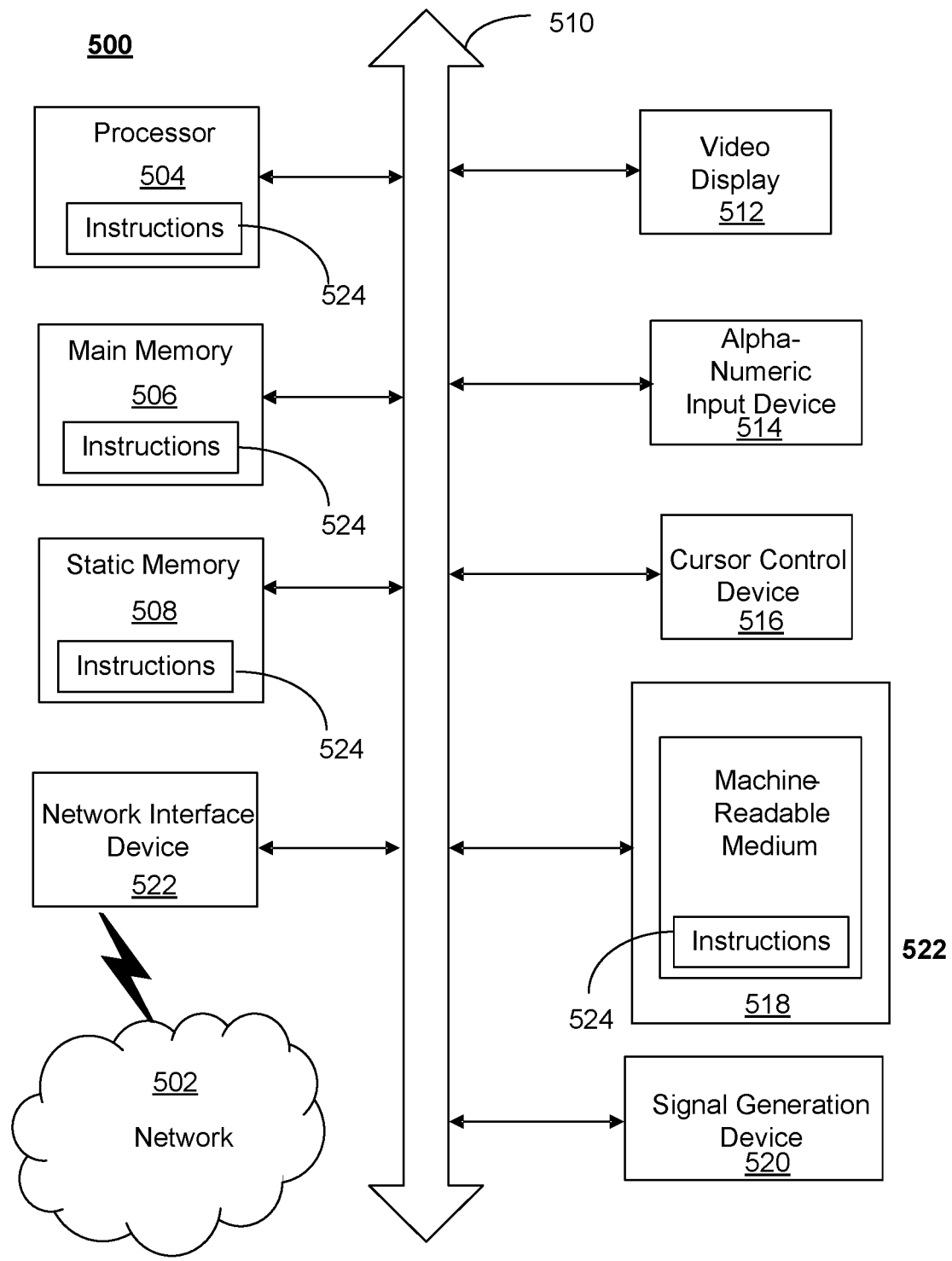
FIG. 8 illustrates an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, server 105, server 106, LB 101, router 102, router 109, and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 9A:
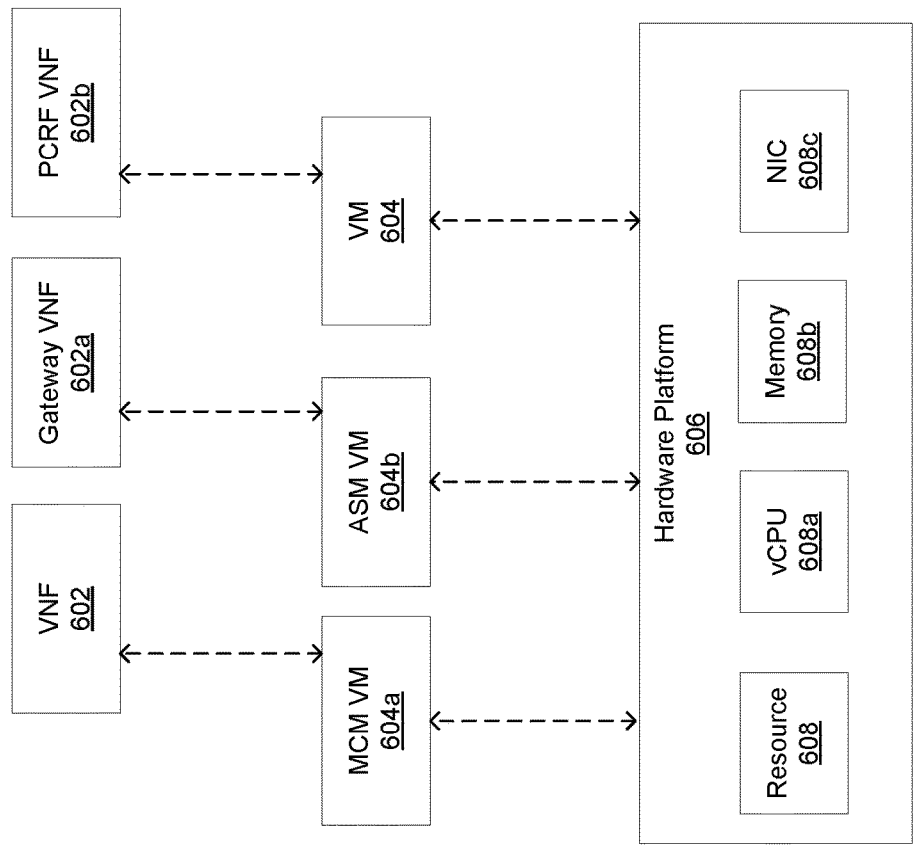
FIG. 9A is a representation of an exemplary network.

FIG. 9a is a representation of an exemplary network 600. Network 600 (e.g., system 100) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 9a illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 9a illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 9B:
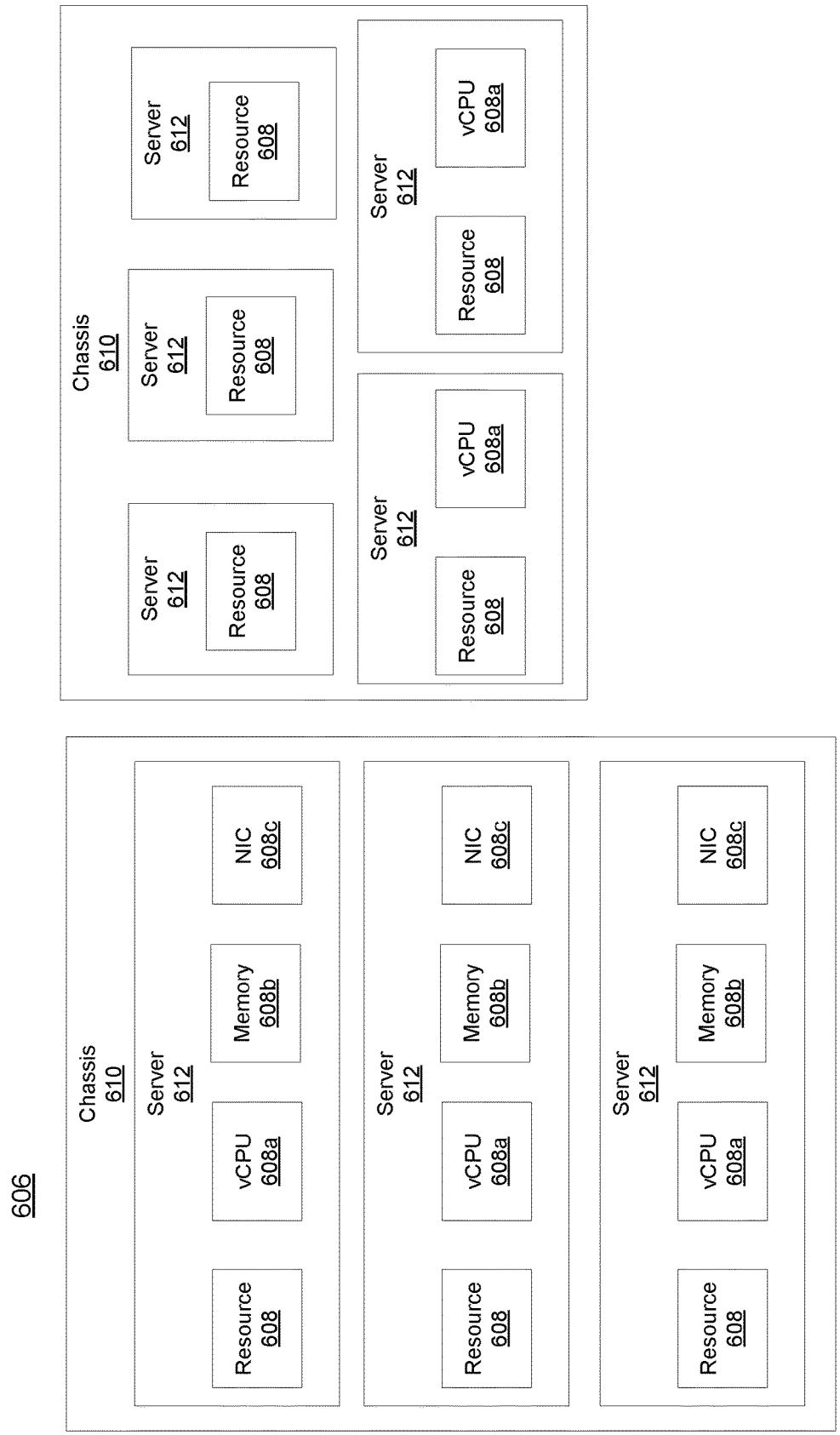
FIG. 9B is a representation of an exemplary hardware platform for a network.

While FIG. 9a illustrates resources 608 as collectively contained in hardware platform 606, the configuration of hardware platform 606 may isolate, for example, certain memory 608c from other memory 608c. FIG. 9b provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 9b illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which model-based load balancing can be processed and managed have been described in connection with various computing devices/processors, the underlying concepts may be applied to any computing device, processor, or system capable of facilitating a telecommunications system. Note that although model-based is disclosed herein, other schemes are contemplated as disclosed. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—model-based load balancing—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Note that although model-based is disclosed herein, other schemes are contemplated as disclosed. LB 101 may be a logical entity and be within another device (e.g., router 102). Such other examples are intended to be within the scope of the claims if they have structural elements that do not differ from the literal language of the claims, or if they include equivalent structural elements with insubstantial differences from the literal languages of the claims.

The methods, systems, and apparatus herein may provide for load balancing by obtaining, by an apparatus, average processing cost per packet for each service chain; determining, by the apparatus, a respective central processing unit (CPU) usage of a first device and a second device, based on the arrival rate of packets for each service chain and processing cost of the packets for each service chain; and based on the respective CPU usage of the first device and the second device, transmitting a packet received by the apparatus to the first device instead of the second device. The first device may be a server (e.g., server 105) that includes a plurality of network functions for each service chain. The methods, systems, or apparatus may add a header to the packet, wherein the header comprises a service chain identifier field. The method, systems, or apparatus may add a header to the packet, wherein the header comprises a network function server identifier field. The method, system, or apparatus may include a header to the packet, wherein the header comprises a central processing unit core identifier field. The CPU usage of the first device that is lower than the CPU usage of the second device. The transmitting of the packet may be further based on the bandwidth of respective interfaces of the first device and the second device to the apparatus. The bandwidth or CPU usage, among other things, may be used to weight whether a packet is sent to one server over another server.

What is claimed:

1. A method comprising:
   obtaining, by an apparatus, average processing cost per packet for each service chain;
   intercepting, by the apparatus, a packet being transmitted from a client device to a destination device;
   determining, by the apparatus, a respective central processing unit (CPU) usage of a first device and a second device, wherein the respective CPU usage of the first device and the second device is based on a product of an arrival rate of packets for each service chain and a processing cost for each service chain;
   adding, by the apparatus, a header to the packet, wherein the header comprises routing information, wherein a direction of the header is set to forward;
   based on the respective CPU usage of the first device and the second device, transmitting the packet received by the apparatus to the first device instead of the second device;
   receiving, by the apparatus, a forward processed packet from the first device, wherein the forward processed packet is the packet after being processed by the first device in a forward direction according to the header;
   responsive to the receiving the forward processed packet from the first device, setting, by the apparatus, the direction of the header of the forward processed packet to reverse;
   transmitting, by the apparatus, the forward processed packet to the first device for the first device to further process the forward processed packet in a reverse direction according to the direction of the header being set to reverse;
   receiving, by the apparatus, a reverse processed packet from the first device, wherein the reverse processed packet is the forward processed packet after being processed in the reverse direction by the first device according to the header;
   removing, by the apparatus, the header from the reverse processed packet based on the destination device being located outside of a data center where the first device is located; and
   transmitting, by the apparatus, the reverse processed packet towards the destination device.

2. The method of claim 1, wherein the first device is a server comprising a plurality of network functions for each service chain and further comprising identifying, by the apparatus, a connection entry in a local flow table, wherein the removing the header and the transmitting the reverse processed packet is based on identifying the connection entry.

3. The method of claim 1, wherein the header comprises a service chain identifier field.

4. The method of claim 1, wherein the header comprises a network function server identifier field.

5. The method of claim 1, wherein the header comprises a central processing unit core identifier field.

6. The method of claim 1, wherein the CPU usage of the first device is lower than the CPU usage of the second device, and further comprising creating, by the apparatus, a temporary connection entry in a local flow table based on a selected core of the first device.

7. The method of claim 1, wherein the transmitting of the packet is further based on a bandwidth of respective interfaces of the first device and the second device to the apparatus, wherein the first device modifies the header, and wherein the routing information includes service chain ID, NF server ID, CPU core ID, direction, flow end, or a combination thereof.

8. An apparatus comprising:
a processor; and
a memory coupled with the processor, the memory storing executable instructions that when executed by the processor cause the processor to effectuate operations comprising:
obtaining average processing cost per packet for each service chain;
intercepting a packet being transmitted from a client device to a destination device;
determining a respective central processing unit (CPU) usage of a first device and a second device, wherein the respective CPU usage of the first device and the second device is based on a product of an arrival rate of packets for each service chain and a processing cost for each service chain;
adding a header to the packet, wherein the header comprises routing information, wherein a direction of the header is set to forward;
based on the respective CPU usage of the first device and the second device, transmitting the packet, received by the apparatus, to the first device instead of the second device;
receiving a forward processed packet from the first device, wherein the forward processed packet is the packet after being processed by the first device in a forward direction according to the header;
responsive to the receiving the forward processed packet from the first device, setting the direction of the header of the forward processed packet to reverse;
transmitting the forward processed packet to the first device for the first device to further process the forward processed packet in a reverse direction according to the direction of the header being set to reverse;
receiving a reverse processed packet from the first device, wherein the reverse processed packet is the forward processed packet after being processed in the reverse direction by the first device according to the header;
removing the header from the reverse processed packet based on the destination device being located outside of a data center where the first device is located; and
transmitting the reverse processed packet towards the destination device.

9. The apparatus of claim 8, wherein the first device is a server comprising a plurality of network functions for each service chain.

10. The apparatus of claim 8, wherein the header comprises a service chain identifier field.

11. The apparatus of claim 8, wherein the header comprises a network function server identifier field.

12. The apparatus of claim 8, wherein the header comprises a central processing unit core identifier field.

13. The apparatus of claim 8, wherein the CPU usage of the first device is lower than the CPU usage of the second device, wherein the operations further comprise identifying, by the apparatus, a connection entry in a local flow table, wherein the removing the header and the transmitting the reverse processed packet is based on identifying the connection entry.

14. The apparatus of claim 8, wherein the transmitting of the packet is further based on a bandwidth of respective interfaces of the first device and the second device to the apparatus.

15. A non-transitory computer readable storage medium storing computer executable instructions that when executed by a computing device cause said computing device to effectuate operations comprising:
obtaining average processing cost per packet for each service chain;
intercepting a packet being transmitted from a client device to a destination device;
determining a respective central processing unit (CPU) usage of a first device and a second device, wherein the respective CPU usage of the first device and the second device is based on a product of an arrival rate of packets for each service chain and a processing cost for each service chain; and
adding a header to the packet, wherein the header comprises routing information, wherein a direction of the header is set to forward;
based on the respective CPU usage of the first device and the second device, transmitting the packet, received by an apparatus, to the first device instead of the second device;
receiving a forward processed packet from the first device, wherein the forward processed packet is the packet after being processed by the first device in a forward direction according to the header;
responsive to the receiving the forward processed packet from the first device, setting the direction of the header of the forward processed packet to reverse;
transmitting the forward processed packet to the first device for the first device to further process the forward processed packet in a reverse direction according to the direction of the header being set to reverse;
receiving a reverse processed packet from the first device, wherein the reverse processed packet is the forward processed packet after being processed in the reverse direction by the first device according to the header;
removing the header from the reverse processed packet based on the destination device being located outside of a data center where the first device is located; and
transmitting the reverse processed packet towards the destination device.

16. The non-transitory computer readable storage medium of claim 15, wherein the first device is a server comprising a plurality of network functions for each service chain, wherein the operations further comprise identifying, by the apparatus, a connection entry in a local flow table, and wherein the removing the header and the transmitting the reverse processed packet is based on identifying the connection entry.

17. The non-transitory computer readable storage medium of claim 15, wherein the header comprises a service chain identifier field.

18. The non-transitory computer readable storage medium of claim 15, wherein the header comprises a network function server identifier field.

19. The non-transitory computer readable storage medium of claim 15, wherein the transmitting of the packet is further based on a bandwidth of respective interfaces of the first device and the second device to the apparatus.

20. The non-transitory computer readable storage medium of claim 15, wherein the apparatus is a virtual machine.

* * * * *